(12) United States Patent
Akiyama

(10) Patent No.: US 12,487,515 B2
(45) Date of Patent: Dec. 2, 2025

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 447 days.

(21) Appl. No.: 18/189,274

(22) Filed: Mar. 24, 2023

(65) Prior Publication Data

US 2023/0305375 A1  Sep. 28, 2023

(30) Foreign Application Priority Data

Mar. 24, 2022 (JP) ................................ 2022-047978

(51) Int. Cl.
*G03B 21/20* (2006.01)
(52) U.S. Cl.
CPC ......... *G03B 21/204* (2013.01); *G03B 21/206* (2013.01); *G03B 21/2066* (2013.01)
(58) Field of Classification Search
CPC . G03B 21/204; G03B 21/206; G03B 21/2066
USPC .......................................................... 353/31
See application file for complete search history.

(56) References Cited

U.S. PATENT DOCUMENTS

2008/0123343 A1* 5/2008 Kobayashi ........... G02B 6/0096
451/29
2011/0310363 A1  12/2011 Kita
2017/0084799 A1  3/2017 Ouderkirk et al.
2021/0384378 A1  12/2021 Ikeda
2022/0206376 A1* 6/2022 Akiyama ............. G03B 21/204

FOREIGN PATENT DOCUMENTS

| JP | 2004-354881 A | 12/2004 | | |
| JP | 2008-026853 A | 2/2008 | | |
| JP | 2008112114 A | * | 5/2008 | ............. G03B 21/14 |
| JP | 2012-004009 A | 1/2012 | | |
| JP | 2012-209036 A | 10/2012 | | |
| JP | 2013-250494 A | 12/2013 | | |
| JP | 2021-193715 A | 12/2021 | | |
| WO | WO-2012133485 A1 | * | 10/2012 | ........... G03B 21/204 |

* cited by examiner

Primary Examiner — Magda Cruz
(74) Attorney, Agent, or Firm — Dority & Manning, P.A.

(57) ABSTRACT

A light source device includes a substrate having a supporting surface, a light source emitting first light, a first optical member having a first optical layer facing the supporting surface and reflecting the first light, a first wavelength conversion layer disposed on the supporting surface, a second wavelength conversion layer disposed at a first wavelength conversion layer side, and a light emitting portion formed by at least the substrate and the first optical member. The first optical layer is inclined with respect to the supporting surface and further reflects the second and third lights. The second wavelength conversion layer converts a part of the first light emitted from the light source into third light. The first wavelength conversion layer converts a part of the first light emitted from the second wavelength conversion layer into second light. The light emitting portion emits the first, second, and third lights.

17 Claims, 9 Drawing Sheets

LIGHT SOURCE DEVICE AND PROJECTOR

The present application is based on, and claims priority from JP Application Serial Number 2022-047978, filed Mar. 24, 2022, the disclosure of which is hereby incorporated by reference herein in its entirety.

BACKGROUND

1. Technical Field

The present disclosure relates to a light source device and a projector.

2. Related Art

In related art, there is a light source device reflecting an excitation light as a linearly-polarized light output from a light source by a polarization beam splitter toward a phosphor and generating a white light using fluorescence output from the phosphor and a part of the excitation light (for example, see JP-A-2012-004009).

However, in the light source device, there is a problem that efficient extraction of an illumination light is difficult because the excitation light in the polarization direction disordered when output from the phosphor is returned to the light source and not available as the illumination light.

SUMMARY

In order to solve the above described problem, a light source device according to an aspect of the present disclosure includes a substrate having a supporting surface, a light source disposed at a supporting surface side and configured to emit first light in a first wavelength range, a first optical member having a first optical layer facing the supporting surface and reflecting the first light emitted from the light source, a first wavelength conversion layer disposed on the supporting surface and having a light incident surface which the first light enters, the first wavelength conversion layer being configured to convert the first light into second light in a second wavelength range different from the first wavelength range, a second wavelength conversion layer disposed at a first wavelength conversion layer side with respect to the first optical layer and configured to convert the first light into third light in a third wavelength range different from the first wavelength range, and a light emitting portion formed by at least the substrate and the first optical member and configured to emit light. The first optical layer is inclined with respect to the light incident surface and further reflects the second light and the third light. The second wavelength conversion layer converts a part of the first light emitted from the light source into the third light. The first wavelength conversion layer converts a part of the first light emitted from the second wavelength conversion layer into the second light. The light emitting portion emits the first light, the second light, and the third light.

A projector according to an aspect of the present disclosure includes the light source device according the aspect of the present disclosure, a light modulation device modulating light emitted from the light source device according to image information, and a projection optical device projecting the light modulated by the light modulation device.

DESCRIPTION OF EXEMPLARY EMBODIMENTS

Figure 1:
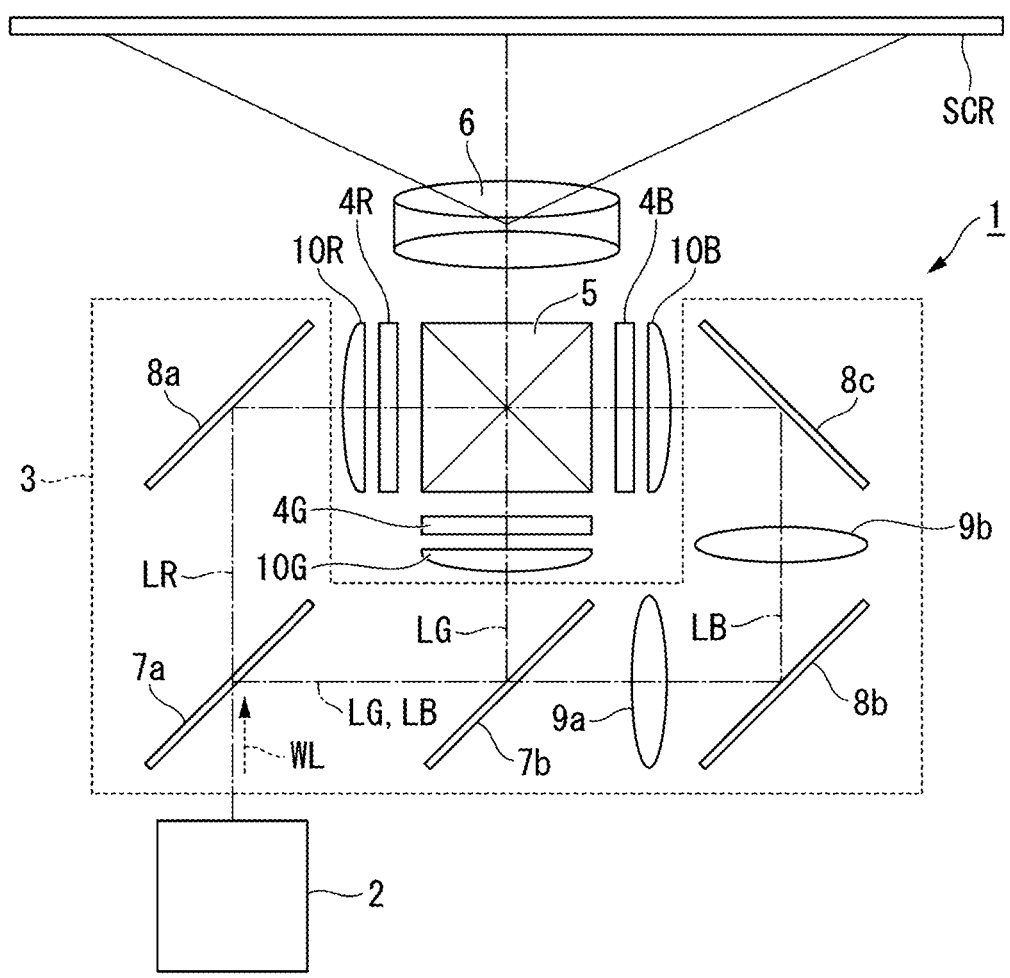
FIG. 1 shows a schematic configuration of a projector according to a first embodiment.

As below, embodiments of the present disclosure will be explained in detail with reference to the drawings.

In the drawings used in the following explanation, to facilitate visualization of the characteristics, characteristic parts may be enlarged for convenience and dimension ratios of the respective component elements etc. are not necessarily the same as real ones.

First Embodiment

An example of a projector according to an embodiment will be explained.

FIG. 1 shows a schematic configuration of the projector according to the embodiment.

As shown in FIG. 1, a projector 1 of the embodiment is a projection-type image display apparatus displaying a color picture on a screen SCR. The projector 1 includes a color separation optical system 3, a light modulation device 4R, a light modulation device 4G, a light modulation device 4B, a light combining system 5, a projection optical device 6, and an illumination device 2.

The color separation optical system 3 separates a white illumination light WL from the illumination device 2 into a red light LR, a green light LG, and a blue light LB. The color separation optical system 3 includes a first dichroic mirror 7a and a second dichroic mirror 7b, a first reflection mirror 8a, a second reflection mirror 8b, and a third reflection mirror 8c, and a first relay lens 9a and a second relay lens 9b.

The first dichroic mirror 7a separates the illumination light WL from the illumination device 2 into the red light LR and the green light LG and the blue light LB as the other lights. The first dichroic mirror 7a transmits the separated red light LR and reflects the other lights. The second dichroic mirror 7b reflects the green light LG and transmits the blue light LB.

The first reflection mirror 8a reflects the red light LR toward the light modulation device 4R. The second reflection mirror 8b and the third reflection mirror 8c guide the blue light LB toward the light modulation device 4B. The green light LG is reflected from the second dichroic mirror 7b toward the light modulation device 4G.

The first relay lens 9a is placed downstream of the second dichroic mirror 7b in the optical path of the blue light LB. The second relay lens 9b is placed downstream of the second reflection mirror 8b in the optical path of the blue light LB.

The light modulation device 4R modulates the red light LR according to image information and forms an image light corresponding to the red light LR. The light modulation device 4G modulates the green light LG according to the image information and forms an image light corresponding to the green light LG. The light modulation device 4B modulates the blue light LB according to the image information and forms an image light corresponding to the blue light LB.

For the light modulation device 4R, the light modulation device 4G, and the light modulation device 4B, e.g., transmissive liquid crystal panels are used. Further, polarizers (not shown) are respectively placed at the light incident sides and the light exiting sides of the liquid crystal panels to pass only linear-polarized lights in particular directions.

A field lens 10R, a field lens 10G, and a field lens 10B are placed at the light incident sides of the light modulation device 4R, the light modulation device 4G, and the light modulation device 4B, respectively. The field lens 10R, the field lens 10G, and the field lens 10B parallelize the principal rays of the red light LR, the green light LG, and the blue light LB entering the light modulation device 4R, the light modulation device 4G, and the light modulation device 4B, respectively.

The image lights output from the light modulation device 4R, the light modulation device 4G, and the light modulation device 4B enter the light combining system 5, and the system combines the image lights corresponding to the red light LR, the green light LG, and the blue light LB and outputs the combined image light toward the projection optical device 6. For the light combining system 5, e.g., a cross dichroic prism is used.

The projection optical device 6 includes a plurality of lenses. The projection optical device 6 enlarges and projects the image light combined by the light combining system 5 toward the screen SCR. Thereby, an image is displayed on the screen SCR.

Illumination Device

Figure 2:
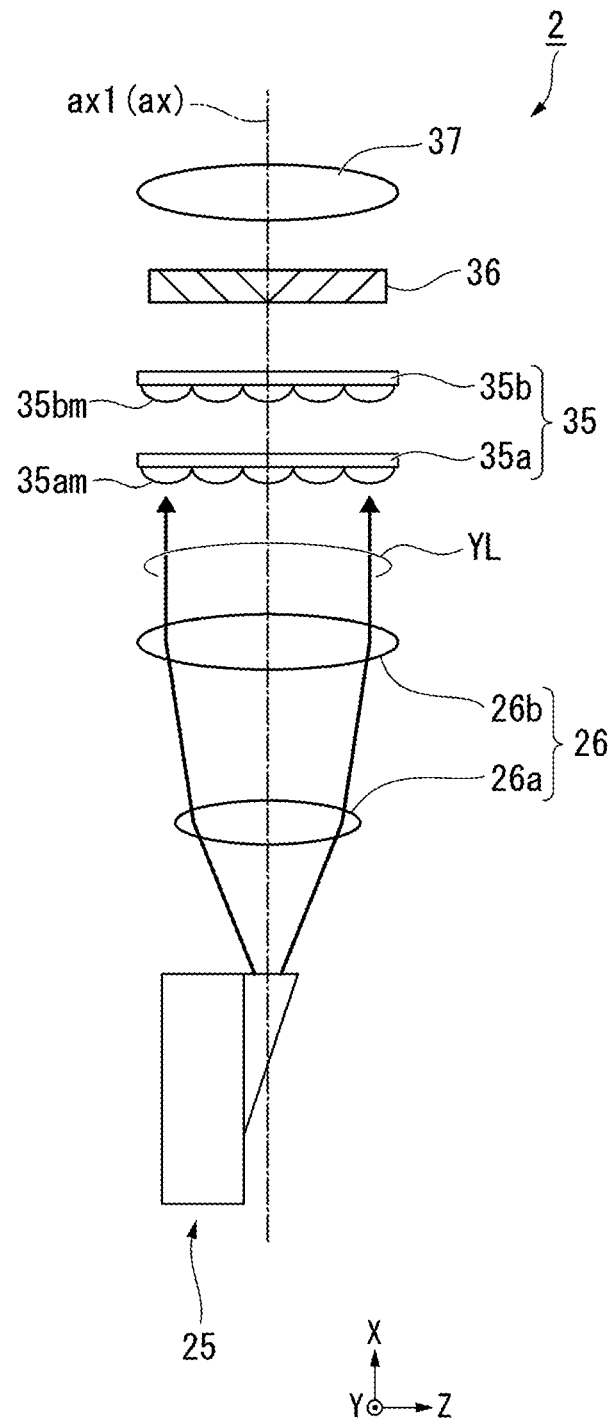
FIG. 2 is a schematic configuration diagram of an illumination device.

FIG. 2 is a schematic configuration diagram of the illumination device 2.

As shown in FIG. 2, the illumination device 2 includes a light source device 25, a pickup optical system 26, an optical integration system 35, a polarization conversion element 36, and a superimposing lens 37.

The light source device 25 outputs the white illumination light WL toward the pickup optical system 26.

As below, a configuration of the light source device 25 will be explained in detail. In the following drawings, the respective configurations of the light source device 25 will be explained using an XYZ coordinate system as necessary. An X-axis is an axis parallel to an optical axis ax of the light source device 25, a Z-axis is an axis orthogonal to the optical axis ax and parallel to the normal of a substrate 252 forming the light source device 25, and a Y-axis is an axis respectively orthogonal to the X-axis and the Z-axis. Note that the optical axis ax of the light source device 25 is aligned with an illumination optical axis ax1 of the illumination device 2 shown in FIG. 2.

Figure 3:
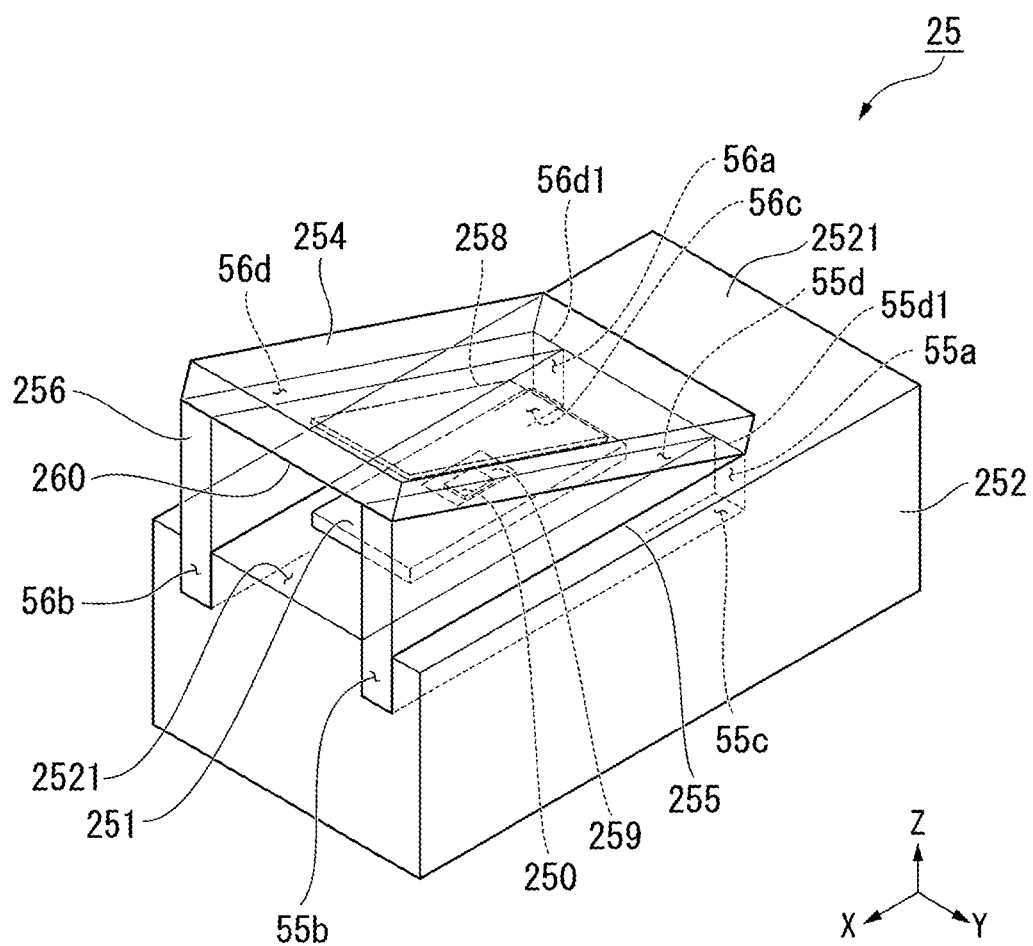
FIG. 3 is a perspective view showing a configuration of a main part of a light source device.
Figure 4:
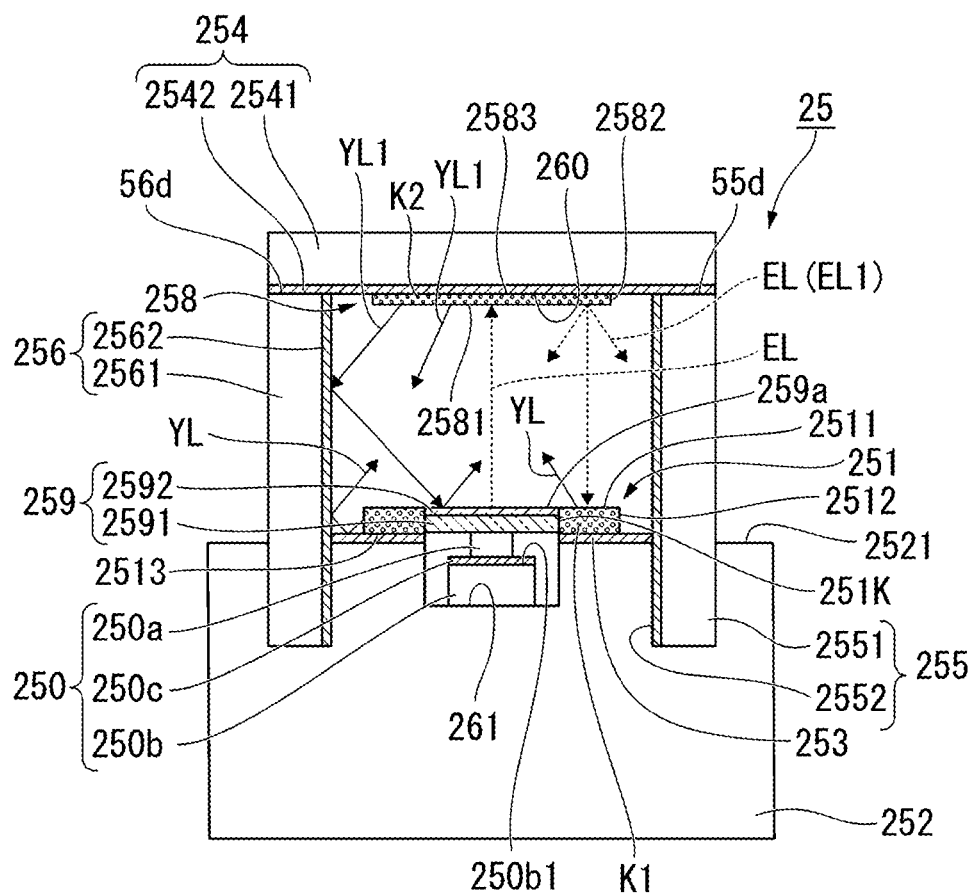
FIG. 4 is a front view of the light source device.
Figure 5:
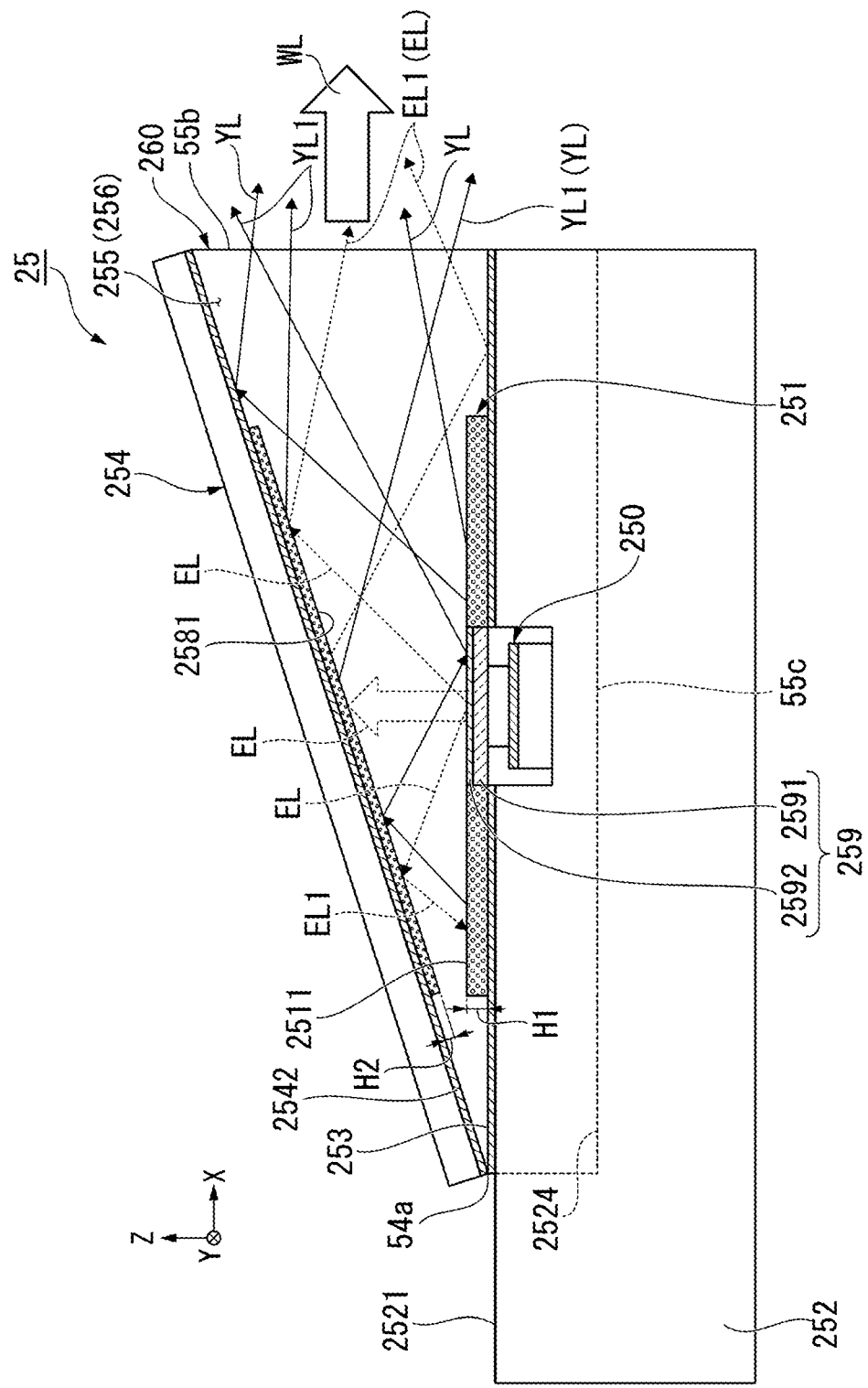
FIG. 5 is a sectional view of the light source device.

FIG. 3 is a perspective view showing a configuration of a main part of the light source device 25. FIG. 4 is a front view of the light source device 25 as seen from the +X side. FIG. 5 is a sectional view of the light source device 25 along a plane along the XZ-plane.

As shown in FIGS. 3 to 5, the light source device 25 of the embodiment includes a light source 250, a first phosphor layer (first wavelength conversion layer) 251, the substrate 252, a mirror layer 253, a first optical member 254, a second optical member 255, a third optical member 256, a second phosphor layer (second wavelength conversion layer) 258, a light-transmissive member 259, and a light emitting portion 260.

The light source 250 has a light emitting device 250a, a base member 250b, and a reflection layer 250c. The light emitting device 250a includes a light emitting diode (LED) and outputs an excitation light (first light) EL. The excitation light EL is a light having a blue wavelength range (first wavelength range) from 400 nm to 480 nm e.g., a light beam having a peak wavelength of 445 nm. The base member 250b supports the light emitting device 250a and also functions as a heat dissipation substrate dissipating heat from the light emitting device 250a. The reflection layer 250c is provided between the base member 250b and the light emitting device 250a. The reflection layer 250c is provided on a front surface 250b1 of the base member 250b. The reflection layer 250c includes e.g., a metal layer or a dielectric layer.

The substrate 252 has a supporting surface 2521 supporting the first phosphor layer 251. The substrate 252 is e.g., a metal plate having a higher heat dissipation property of aluminum or copper.

The supporting surface 2521 is a surface parallel to the XY-plane. A concave portion 261 is formed in the supporting surface 2521 of the substrate 252. The light source 250 is provided at the supporting surface 2521 side of the substrate 252. In the embodiment, the light source 250 is placed in the concave portion 261 formed in the supporting surface 2521. The base member 250b of the light source 250 and a front surface 261a of the concave portion 261 are thermally coupled. The light source 250 is thermally coupled to the substrate 252, and thereby, the light emitting device 250a may be cooled by dissipation of heat from the light source 250 to the substrate 252.

The first phosphor layer 251 is a plate-like phosphor having a front surface (light incident surface) 2511, a side surface 2512, and a back surface 2513. The front surface 2511 is a surface into which the excitation light EL is entered. The side surface 2512 is a surface crossing the front surface 2511. The side surface 2512 may be orthogonal to the front surface 2511. The back surface 2513 is an opposite surface to the front surface 2511.

In the embodiment, an excitation light output from the second phosphor layer 258 enters the front surface 2511 of the first phosphor layer 251 as will be described later.

The first phosphor layer 251 contains phosphor particles excited by the excitation light and emitting e.g., fluorescence (second light) YL as a yellow light having a yellow wavelength range (second wavelength range) from 550 to 640 nm. As the phosphor particles, e.g., a YAG (yttrium aluminum garnet) phosphor may be used. Note that one kind of material may be used to form the phosphor particles, or particles formed using two or more kinds of materials may be mixed and used as the phosphor particles. As the first phosphor layer 251, e.g., a phosphor layer formed by dispersion of phosphor particles in an inorganic binder such as alumina, a phosphor layer formed by sintering of phosphor particles without using a binder may be used. The first phosphor layer 251 contains a plurality of scatterers K1. As the scatterers K1, pores or permeable particles having a different refractive index from the phosphor are used. In the case of the embodiment, pores are used as the scatterers K1.

The substrate 252 is thermally coupled to the first phosphor layer 251. The substrate 252 is thermally coupled to the first phosphor layer 251, and thereby, the first phosphor layer 251 is cooled by dissipation of heat of the first phosphor layer 251.

The first phosphor layer 251 has a cutout 251K formed by partially cutting out. The cutout 251K is provided to penetrate the first phosphor layer 251 and exposes a part of the substrate 252.

The first phosphor layer 251 is supported by the supporting surface 2521 of the substrate 252 with the concave portion 261 facing within the cutout 251K in a plan view. As described above, the light source 250 is placed in the concave portion 261. Accordingly, the light source 250 is placed in the cutout 251K. The cutout 251K has a rectangular planar shape. The size of the cutout 251K is equal to or slightly larger than that of the outer shape of the light source 250.

The mirror layer 253 is provided between the substrate 252 and the first phosphor layer 251. The area of the mirror layer 253 is larger than the area of the back surface 2513 of the first phosphor layer 251. The mirror layer 253 is provided at least around the first phosphor layer 251 on the supporting surface 2521 of the substrate 252. The first phosphor layer 251 is joined to the supporting surface 2521 of the substrate 252 via the mirror layer 253. The mirror layer 253 includes e.g., a metal layer or a dielectric layer. Note that the mirror layer 253 may be formed in the whole area of the supporting surface 2521. Further, a part of the mirror layer 253 may be directly formed on the back surface 2513 of the first phosphor layer 251.

The first optical member 254 is placed to face the supporting surface 2521 of the substrate 252. That is, the first optical member 254 is placed to face the front surface 2511 of the first phosphor layer 251. The first optical member 254 is placed not into contact with the first phosphor layer 251.

The first optical member 254 is placed to incline relative to the front surface 2511 of the first phosphor layer 251. The angle in the first optical member 254 relative to the front surface 2511 of the first phosphor layer 251 is set to an acute angle.

The first optical member 254 includes a base member 2541 and a first optical layer 2542. As the material forming the base member 2541, e.g., any one of a light-transmissive member of alumina, sapphire, glass, or the like or a member without light transmissivity of a metal or the like may be used. The first optical layer 2542 includes e.g., a dielectric multilayer film or a metal film. The first optical member 254 functions as a mirror reflecting the entering light. The first optical layer 2542 reflects fluorescence YL, YL1 (second light, third light), which will be described later, in addition to the excitation light EL from the light source 250.

The second phosphor layer 258 is placed at the first phosphor layer 251 side with respect to the first optical member 254, i.e., the first phosphor layer 251 side with respect to the first optical layer 2542. In the case of the embodiment, the second phosphor layer 258 is provided in the first optical layer 2542.

The second phosphor layer 258 is a plate-like phosphor having a front surface (light incident surface) 2581, a side surface 2582, and a back surface 2583. The front surface 2581 is a surface into which the excitation light EL is entered. The back surface 2583 is an opposite surface to the front surface 2581 and contacts the first optical layer 2542. The side surface 2582 is a surface crossing the front surface 2581. The side surface 2582 may be orthogonal to the front surface 2581.

In the case of the embodiment, the second phosphor layer 258 is formed using the same phosphor material as that of the first phosphor layer 251. The second phosphor layer 258 converts the excitation light EL into e.g., the fluorescence YL1 as a yellow light having a yellow wavelength range from 550 to 640 nm different from the blue wavelength range (first wavelength range). That is, the second phosphor layer 258 converts a part of the excitation light EL output from the light source 250 into the fluorescence YL1.

In the embodiment, the yellow wavelength range (third wavelength range) of the fluorescence YL1 emitted by the second phosphor layer 258 is the same as the yellow wavelength range (second wavelength range) of the fluorescence YL emitted by the first phosphor layer 251.

The second phosphor layer 258 contains a plurality of scatterers K2. As the scatterers K2, pores or permeable particles having a different refractive index from the phosphor are used. In the case of the embodiment, pores are used as the scatterers K2.

In the embodiment, the degree of scattering of light in the second phosphor layer 258 is lower than the degree of scattering of light in the first phosphor layer 251. The degree of scattering of light can be adjusted by the number of scatterers contained in the phosphor. In the case of the embodiment, the number of scatterers K2 contained in the second phosphor layer 258 is smaller than the number of scatterers K1 contained in the first phosphor layer 251. For example, the second phosphor layer 258 with less scatterers may be realized using a single-crystal phosphor.

In the second phosphor layer 258, backscatter of light is suppressed compared to that in the first phosphor layer 251, and thereby, the excitation light EL entering from the light source 250 is easily transmitted within the phosphor without being scattered.

Further, in the case of the embodiment, a thickness H2 of the second phosphor layer 258 is smaller than a thickness H1 of the first phosphor layer 251. The thickness H2 of the second phosphor layer 258 is a dimension of the surface on which the second phosphor layer 258 is provided (the front surface of the first optical layer 2542 of the first optical member 254) in the normal direction, and the thickness H1 of the first phosphor layer 251 is a dimension of the supporting surface 2521 on which the first phosphor layer 251 is provided in the normal direction. In other words, the thickness H2 of the second phosphor layer 258 is a dimension of the front surface 2581 (light incident surface) of the second phosphor layer 258 in the normal direction, and the thickness H1 of the first phosphor layer 251 is a dimension of the front surface 2511 (light incident surface) of the first phosphor layer 251 in the normal direction.

The smaller the thickness of the phosphor, the more easily the excitation light is output from the phosphor before conversion into fluorescence.

In the embodiment, as described above, the backscatter and the thickness of the second phosphor layer 258 are suppressed compared to those of the first phosphor layer 251, and the fluorescence conversion efficiency of the second phosphor layer 258 is suppressed. Thereby, a large part of the excitation light EL output from the light source 250 is not converted into the fluorescence in the second phosphor layer 258, but transmitted through the second phosphor layer 258, enters the first optical member 254, and is reflected by the first optical layer 2542 of the first optical member 254. At least a part of the excitation light EL reflected by the first optical layer 2542 is transmitted through the second phosphor layer 258 and output from the second phosphor layer 258 toward the first phosphor layer 251.

In the second phosphor layer 258, a part of the fluorescence YL1 is directly output from the front surface 2581 of the second phosphor layer 258 and the other part of the fluorescence YL1 travels toward the first optical member 254 side, and then, is reflected by the first optical layer 2542 and output from the front surface 2581.

The second phosphor layer 258 outputs a large part of the excitation light EL without wavelength conversion in addition to the fluorescence YL1 formed by wavelength conversion of the excitation light EL. That is, the second phosphor layer 258 outputs a light containing the fluorescence YL1 and the excitation light EL.

In the embodiment, the first phosphor layer 251 converts a part of the excitation light EL output from the second phosphor layer 258 into the fluorescence YL. That is, the first phosphor layer 251 is excited not by the excitation light EL output from the light source 250 and directly entering, but by the excitation light EL indirectly entering via the second phosphor layer 258.

As shown in FIGS. 4 and 5, the light-transmissive member 259 is provided in contact at the light exiting side (+Z side) of the light source 250. In the case of the embodiment, the light-transmissive member 259 is in contact with the light emitting device 250a of the light source 250. The light-transmissive member 259 has a size equal to that of the cutout 251K formed in the first phosphor layer 251 and fitted in the cutout 251K. The light-transmissive member 259 also functions as a heat dissipation member for the light emitting device 250a of the light source 250.

In the embodiment, a front surface 259a of the light-transmissive member 259 at the first optical member 254 side is level with the front surface 2511 of the first phosphor layer 251. That is, the front surface 259a of the light-transmissive member 259 and the front surface 2511 of the first phosphor layer 251 are placed on the same plane in directions along the normal of the supporting surface 2521 of the substrate 252.

The light-transmissive member 259 includes a light-transmissive substrate 2591 and a second optical layer 2592. The light-transmissive substrate 2591 is formed using a light-transmissive member of alumina, sapphire, glass, or the like. The second optical layer 2592 is provided on the outer surface of the light-transmissive substrate 2591, that is, at the opposite side to the light source 250. The second optical layer 2592 has a property of transmitting the excitation light EL and reflecting fluorescence. Thereby, the light-transmissive member 259 transmits the excitation light EL output from the light source 250 and reflects the fluorescence YL generated in the first phosphor layer 251 and the fluorescence YL1 generated in the second phosphor layer 258. Note that an antireflection film such as an AR coating is provided on the inner surface of the light-transmissive substrate 2591, that is, at the light source 250 side. Thereby, the light-transmissive member 259 suppresses the reflection of the excitation light EL output from the light source 250, and thereby, efficiently enters the excitation light into the member.

The light emitting portion 260 is an opening formed by the respective end surfaces at the +X side of the substrate 252, the first optical member 254, the second optical member 255, and the third optical member 256. The light emitting portion 260 outputs the white illumination light WL containing the excitation light EL, the fluorescence YL, and the fluorescence YL1.

The second optical member 255 includes a base member 2551 and a third optical layer 2552. As the material forming the base member 2551, e.g., any one of a light-transmissive member of alumina, sapphire, glass, or the like or a member without light transmissivity of a metal or the like may be used. The third optical layer 2552 is formed on the inner surface of the base member 2551. The third optical layer 2552 includes e.g., a dielectric multilayer film or a metal film.

The second optical member 255 is placed to cross the supporting surface 2521 of the substrate 252 and the first optical member 254. The second optical member 255 is placed with the third optical layer 2552 crossing the supporting surface 2521 and the first optical layer 2542. The second optical member 255 may be orthogonal to the supporting surface 2521 of the substrate 252 and the first optical member 254. The third optical layer 2552 may be orthogonal to the supporting surface 2521 and the first optical layer 2542. The second optical member 255 is placed in thickness directions along the Y-axis directions. The second optical member 255 is placed near the +Y side of the first phosphor layer 251 and the second phosphor layer 258. Accordingly, a part of the fluorescence YL, YL1 output from the first phosphor layer 251 or the second phosphor layer 258 toward the +Y side is reflected by the third optical layer 2552 of the second optical member 255. The second optical member 255 reflects not only the fluorescence YL, YL1 but also the excitation light EL.

The second optical member 255 has a trapezoidal plate shape.

As shown in FIG. 3, the second optical member 255 includes a first end surface 55a forming an upper bottom portion of the trapezoidal shape, a second end surface 55b forming a lower bottom portion of the trapezoidal shape, a third end surface 55c coupling the first end surface 55a and the second end surface 55b at the +X side, and a fourth end surface 55d coupling the first end surface 55a and the second end surface 55b at the −X side. Note that all of the first end surface 55a, the second end surface 55b, the third end surface 55c, and the fourth end surface 55d are planar surfaces. The third end surface 55c is a surface facing the substrate 252. The fourth end surface 55d is a surface at the opposite side to the third end surface 55c in the base member 2551. The first optical member 254 is in contact with the fourth end surface 55d. The first optical member 254 is mounted on the fourth end surface 55d. The first optical layer 2542 is in contact with the fourth end surface 55d. The base member 2541 is mounted on the fourth end surface 55d via the first optical layer 2542.

Here, when glass is used as the material of the base member 2551, chamfering for preventing a crack by removing sharp portions is necessary. In the embodiment, the second optical member 255 is formed in the trapezoidal plate shape and chamfering is unnecessary, and thereby, workability of the base member 2551 is increased.

In the case of the embodiment, a part of the second optical member 255 is embedded in the substrate 252. Therefore, the second optical member 255 is strongly supported by the substrate 252.

A part of an end portion at the +X side in the second optical member 255 is fitted in a groove 2524 formed in the supporting surface 2521 of the substrate 252. Note that a gap between the second optical member 255 and the groove 2524 may be filled with an adhesive.

Specifically, in the second optical member 255, the whole first end surface 55a and third end surface 55c and a part of the second end surface 55b are fitted in the groove 2524. An end side 55d1 located at the most −X side of the fourth end surface 55d along the Z directions is level with the supporting surface 2521 of the substrate 252. Thereby, the fourth end surface 55d and the supporting surface 2521 of the substrate 252 are smoothly coupled. Further, at the +X side, the second end surface 55b is level with an end surface 52 of the substrate 252.

The third optical member 256 has the same configuration as the second optical member 255.

That is, the third optical member 256 includes a base member 2561 and a fourth optical layer 2562. The fourth optical layer 2562 is formed on the inner surface of the base member 2561.

The third optical member 256 is placed to cross the supporting surface 2521 of the substrate 252 and the first optical member 254 and face the second optical member 255. The third optical member 256 is placed with the fourth optical layer 2562 crossing the supporting surface 2521 and the first optical layer 2542 and facing the third optical layer 2552. The third optical member 256 may be orthogonal to the supporting surface 2521 of the substrate 252 and the first optical member 254. The fourth optical layer 2562 may be orthogonal to the supporting surface 2521 and the first optical layer 2542. The third optical member 256 is placed in thickness directions along the Y-axis directions. The third optical member 256 is placed near the −Y side of the first phosphor layer 251 and the second phosphor layer 258. Accordingly, the fluorescence YL, YL1 output from the first phosphor layer 251 or the second phosphor layer 258 toward the −Y side and entering the third optical member 256 is reflected by the fourth optical layer 2562 of the third optical member 256. The third optical member 256 reflects not only the fluorescence YL, YL1 but also the excitation light EL.

The third optical member 256 has the same trapezoidal plate shape as the second optical member 255.

The third optical member 256 includes a first end surface 56a forming an upper bottom portion of the trapezoidal shape, a second end surface 56b forming a lower bottom portion of the trapezoidal shape, a third end surface 56c coupling the first end surface 56a and the second end surface 56b at the +X side, and a fourth end surface 56d coupling the first end surface 56a and the second end surface 56b at the −X side. Note that all of the first end surface 56a, the second end surface 56b, the third end surface 56c, and the fourth end surface 56d are planar surfaces. The third end surface 56c is a surface facing the substrate 252. The fourth end surface 56d is a surface at the opposite side to the third end surface 56c in the base member 2561. The first optical member 254 is in contact with the fourth end surface 56d. The first optical member 254 is mounted on the fourth end surface 56d. The first optical layer 2542 is in contact with the fourth end surface 56d. The base member 2541 is mounted on the fourth end surface 56d via the first optical layer 2542.

In the case of the embodiment, a part of the third optical member 256 is embedded in the substrate 252, and the third optical member 256 is strongly supported by the substrate 252.

A part of an end portion at the +X side in the third optical member 256 is fitted in the groove 2524 formed in the supporting surface 2521 of the substrate 252. A gap between the third optical member 256 and the groove 2524 may be filled with an adhesive.

Specifically, in the third optical member 256, the whole first end surface 56a and third end surface 56c and a part of the second end surface 56b are fitted in the groove 2524. An end side 56d1 located at the most −X side of the fourth end surface 56d along the Z directions is level with the supporting surface 2521 of the substrate 252. Thereby, the fourth end surface 56d and the supporting surface 2521 of the substrate 252 are smoothly coupled. Further, at the +X side, the second end surface 56b is level with the end surface 52 of the substrate 252.

In the embodiment, the first optical member 254 is supported by the second optical member 255 and the third optical member 256. The first optical member 254 is bonded and fixed to the second optical member 255 and the third optical member 256.

Specifically, the first optical member 254 is provided over between the fourth end surface 55d of the second optical member 255 and the fourth end surface 56d of the third optical member 256. At the −X side, an end side 54a inside of the first optical member 254 is in contact with the supporting surface 2521 of the substrate 252.

According to the configuration, the light source device 25 of the embodiment closes the −X side by the substrate 252, the first optical member 254, the second optical member 255, and the third optical member 256 and forms the light emitting portion 260 at the +X side. Therefore, the light source device 25 may prevent a leakage of light from the opposite side to the light emitting portion 260 in the fluorescence YL and efficiently output a light from the light emitting portion 260.

The light source 250 radiates the excitation light EL by Lambertian emission. The excitation light EL output from the light source 250 by Lambertian emission is transmitted through the light-transmissive member 259 and enters the entire area of the second phosphor layer 258 placed to face the light source 250.

In the embodiment, in the second phosphor layer 258, the backscatter and the thickness are suppressed compared to those of the first phosphor layer 251, and thereby, the fluorescence conversion efficiency is suppressed.

Accordingly, a large part of the excitation light EL is not converted into the fluorescence, but transmitted through the second phosphor layer 258 and enters the first optical layer 2542 of the first optical member 254. The first optical layer 2542 reflects the excitation light EL toward the supporting surface 2521 of the substrate 252. At least a part of the excitation light EL reflected by the first optical layer 2542 is transmitted through the second phosphor layer 258 and output toward the supporting surface 2521 of the substrate 252. Note that a part of the excitation light EL is backscattered in the second phosphor layer 258 or reflected by the front surface and output toward the supporting surface 2521 of the substrate 252.

As described above, the second phosphor layer 258 is configured to output the part of the excitation light EL toward the supporting surface 2521 of the substrate 252. Hereinafter, the light output from the second phosphor layer 258 toward the supporting surface 2521 of the substrate 252 of the excitation light EL output from the light source 250 is referred to as "excitation light EL1".

A part of the excitation light EL entering the second phosphor layer 258 is converted into the fluorescence YL1. The fluorescence YL1 is output from the second phosphor layer 258 via the first optical layer 2542 or not via the first optical layer 2542. At least a part of the fluorescence YL1 output from the second phosphor layer 258 is output from the light emitting portion 260.

Or, a part of the fluorescence YL1 enters the supporting surface 2521 of the substrate 252 and is reflected by the mirror layer 253 formed on the supporting surface 2521. At least a part of the fluorescence YL1 reflected by the mirror layer 253 is output from the light emitting portion 260.

Further, a part of the fluorescence YL1 enters the first phosphor layer 251, is backscattered in the first phosphor layer 251, and output from the light emitting portion 260.

Or, a part of the fluorescence YL1 entering the first phosphor layer 251 is transmitted through the first phosphor layer 251 and reflected by the mirror layer 253, and output from the light emitting portion 260.

The excitation light EL1 output from the second phosphor layer 258 enters the first phosphor layer 251. As described above, in the first phosphor layer 251, the fluorescence conversion efficiency is increased by increase of the degree of scattering of light and the thickness compared to the second phosphor layer 258. Accordingly, a large part of the excitation light EL1 output from the second phosphor layer 258 is converted into the fluorescence YL in the first phosphor layer 251. At least a part of the fluorescence YL output from the first phosphor layer 251 is output from the light emitting portion 260.

Further, a part of the fluorescence YL output from the first phosphor layer 251 enters the second phosphor layer 258, is backscattered or reflected in the second phosphor layer 258, and output from the light emitting portion 260.

A part of the fluorescence YL entering the second phosphor layer 258 is transmitted through the second phosphor layer 258, reflected by the first optical layer 2542 of the first optical member 254, and output from the light emitting portion 260.

A part of the fluorescence YL reflected by the first optical layer 2542 of the first optical member 254 enters the supporting surface 2521 of the substrate 252, is reflected by the mirror layer 253 formed on the supporting surface 2521, and output from the light emitting portion 260.

Parts of the fluorescence YL, YL1 enter the light-transmissive member 259 and are reflected by the second optical layer 2592 provided on the outer surface of the light-transmissive member 259. At least parts of the fluorescence YL, YL1 reflected by the second optical layer 2592 of the light-transmissive member 259 are output from the light emitting portion 260.

A part of the excitation light EL1 output from the second phosphor layer 258 and entering the light-transmissive member 259 is transmitted through the second optical layer 2592 provided on the outer surface of the light-transmissive member 259, and enters the light source 250 side. A part of the excitation light EL1 transmitted through the second optical layer 2592 is reflected by the reflection layer 250c of the light source 250, transmitted through the light-transmissive member 259, and output toward the second phosphor layer 258. Then, the part of the excitation light is used for excitation of the second phosphor layer 258 or the first phosphor layer 251 or as a part of the illumination light WL.

Parts of the excitation lights EL, EL1 and parts of the fluorescence YL, YL1 enter the second optical member 255 or the third optical member 256 via the mirror layer 253 or directly enter the second optical member 255 or the third optical member 256 not via the mirror layer 253. Parts of the excitation lights EL, EL1 and parts of the fluorescence YL, YL1 are reflected by the second optical member 255 or the third optical member 256 and output from the light emitting portion 260.

Note that parts of the excitation lights EL, EL1 and parts of the fluorescence YL, YL1 propagate in the opposite direction (−X side) to the light emitting portion 260, however, are repeatedly reflected and eventually output from the light emitting portion 260.

As described above, in the light source device 25 of the embodiment, the white illumination light WL containing the fluorescence YL generated in the first phosphor layer 251, the fluorescence YL1 generated in the second phosphor layer 258, and parts of the excitation lights EL, EL1 output from the light source 250 may be output from the light emitting portion 260.

In the light source device 25 of the embodiment, in the first phosphor layer 251, heat tends to accumulate and the temperature tends to be higher at the −X side as the opposite side to the light emitting portion 260 compared to the light emitting portion 260 side outputting the fluorescence YL. On the other hand, in the light source device 25 of the embodiment, as shown in FIGS. 3 and 5, the substrate 252 supporting the first phosphor layer 251 in a shape elongated to the opposite side to the light emitting portion 260 is employed. Therefore, according to the light source device 25 of the embodiment, in the first phosphor layer 251, the opposite side to the light emitting portion 260 where heat tends to accumulate may be efficiently cooled. Thus, the first phosphor layer 251 may be efficiently cooled.

Further, in the light source device 25 of the embodiment, the heat of the second phosphor layer 258 is dissipated via the first optical member 254, and thereby, the second phosphor layer 258 may be efficiently cooled. Therefore, the fluorescence conversion efficiency of the second phosphor layer 258 may be increased.

The illumination light WL output from the light source device 25 enters the pickup optical system 26. The pickup optical system 26 includes e.g., pickup lenses 26a, 26b. The pickup optical system 26 has a function of picking up and parallelizing the illumination light WL output from the light source device 25.

The illumination light WL enters the optical integration system 35. The optical integration system 35 includes e.g., a first lens array 35a and a second lens array 35b.

The first lens array 35a includes a plurality of first small lenses 35am and the second lens array 35b includes a plurality of second small lenses 35bm.

The first lens array 35a separates the illumination light WL into a plurality of small pencils of light. The first small lenses 35am focus the small pencils of light on the corresponding second small lenses 35bm. The optical integration system 35 uniformizes the illuminance distributions of the image formation areas of the light modulation devices 4R, 4G, 4B shown in FIG. 1 as illuminated areas in cooperation with the superimposing lens 37, which will be described later.

The illumination light WL passing through the optical integration system 35 enters the polarization conversion element 36. The polarization conversion element 36 includes e.g., a polarization separation film and a retardation film (half-wave plate). The polarization conversion element 36 converts the polarization directions in the illumination light WL into one polarization component.

The illumination light WL passing through the polarization conversion element 36 enters the superimposing lens 37. The illumination light WL output from the superimposing lens 37 enters the color separation optical system 3. The superimposing lens 37 superimposes the plurality of small pencils of light forming the illumination light WL in the illuminated areas, i.e., the image formation areas of the light modulation devices 4R, 4G on one another for uniform illumination.

According to the light source device 25 of the above described embodiment, the following effects are exerted.

The light source device 25 of the embodiment includes the substrate 252 having the supporting surface 2521, the light source 250 placed at the supporting surface 2521 side and outputting the excitation light EL, the first optical member 254 having the first optical layer 2542 facing the supporting surface 2521 and reflecting the excitation light EL output from the light source 250, the first phosphor layer 251 placed on the supporting surface 2521, having the front surface 2511 entered by the excitation light EL, and converting the excitation light EL into the fluorescence YL, the second phosphor layer 258 placed at the first phosphor layer 251 side with respect to the first optical layer 2542 and converting the excitation light EL into the fluorescence YL1, and the light emitting portion 260 formed by at least the substrate 252 and the first optical member 254 and outputting a light. The first optical layer 2542 inclines relative to the front surface 2511 and further reflects the fluorescence YL and the fluorescence YL1, the second phosphor layer 258 converts the excitation light EL output from the light source 250 into the fluorescence YL1, the first phosphor layer 251 converts a part of the excitation light EL1 output from the second phosphor layer 258 into the fluorescence YL, and the light emitting portion 260 outputs the excitation light EL, the fluorescence YL, and the fluorescence YL1.

According to the light source device 25 of the embodiment, the fluorescence YL1 generated by excitation of the second phosphor layer 258 using the excitation light EL output from the light source 250, the fluorescence YL generated by excitation of the first phosphor layer 251 using the excitation light EL1 not used for the excitation of the fluorescence YL1, but output from the second phosphor layer 258, and a part of the excitation light EL output from the light source 250, but not used for the excitation of the fluorescence YL, YL1 may be extracted as the white illumination light WL from the light emitting portion 260. Therefore, according to the light source device 25 of the embodiment, the bright white illumination light WL may be output from the light emitting portion 260.

In the light source device 25 of the embodiment, the area of the light emitting portion 260 may be regarded as an apparent light emission area of the light source device, and thereby, etendue in the illumination light WL may be made smaller. In the light source device 25 of the embodiment, the etendue may be made smaller without reduction of the incident area of the excitation light EL on the first phosphor layer 251 or the second phosphor layer 258, thereby, and lowering of the fluorescence conversion efficiency due to increased light density of the excitation light EL may be suppressed on the first phosphor layer 251 or the second phosphor layer 258.

According to the light source device 25 of the embodiment, the increase of the light density of the excitation light EL may be suppressed and the bright white illumination light WL with the small etendue may be generated.

In the light source device 25 of the embodiment, the fluorescence YL1 output from the second phosphor layer 258 has the same yellow wavelength range as the fluorescence YL output from the first phosphor layer 251. Further, the excitation light EL is the blue light. The light emitting portion 260 outputs the white illumination light WL containing the fluorescence YL, YL1 and the excitation light EL.

According to the configuration, the bright white light may be generated as the illumination light WL.

In the light source device 25 of the embodiment, the thickness H2 of the second phosphor layer 258 is smaller than the thickness H1 of the first phosphor layer 251.

According to the configuration, compared to a case where the thicknesses of the first phosphor layer 251 and the second phosphor layer 258 are the same, the wavelength conversion in the excitation light EL output from the light source 250 and entering the second phosphor layer 258 may be suppressed and the excitation light EL may be efficiently output from the second phosphor layer 258 toward the first phosphor layer 251. Thereby, the first phosphor layer 251 may be efficiently excited to generate the fluorescence YL.

In the light source device 25 of the embodiment, the degree of scattering of light in the second phosphor layer 258 is lower than the degree of scattering of light in the first phosphor layer 251.

According to the configuration, scattering of light is suppressed and thereby, the excitation light EL is easily transmitted within the second phosphor layer 258. Thereby, compared to a case where the degrees of scattering of light in the first phosphor layer 251 and the second phosphor layer 258 are the same, the excitation light EL is transmitted through the second phosphor layer 258 and efficiently enters the first phosphor layer 251. Thereby, the first phosphor layer 251 may be efficiently excited to generate the fluorescence YL.

In the light source device 25 of the embodiment, the first phosphor layer 251 has the cutout 251K formed by partially cutting out, and the light source 250 is placed in the cutout 251K of the first phosphor layer 251.

According to the configuration, the light source 250 may be placed in a desired position on the supporting surface 2521 without an interference with the first phosphor layer 251. Accordingly, the degree of freedom of the layout of the light source 250 on the substrate 252 is increased.

In the light source device 25 of the embodiment, the light source 250 has the light emitting device 250a emitting the excitation light EL, the base member 250b supporting the light emitting device 250a, and the reflection layer 250c provided between the base member 250b and the light emitting device 250a.

According to the configuration, the excitation light EL returned to the light source 250 side may be reflected by the reflection layer 250c and returned toward the first optical member 254 side. Accordingly, the use efficiency of the excitation light EL may be increased.

The light source device 25 of the embodiment further includes the light-transmissive member 259 provided in contact with the light exiting side of the light source 250. Further, the light-transmissive member 259 has the second optical layer 2592 provided at the opposite side to the light source 250, transmitting the excitation light EL, and reflecting the fluorescence YL, YL1.

According to the configuration, heat may be dissipated from the light source 250 by the light-transmissive member 259. Thereby, the heat of the light source 250 may be dissipated from both the substrate 252 and the light-transmissive member 259 and heat resistance of the light source 250 may be further increased.

Further, the light-transmissive member 259 may reflect and output parts of the fluorescence YL, YL1 from the light emitting portion 260 by the second optical layer 2592. Therefore, the extraction efficiency of the illumination light WL may be further increased.

In the light source device 25 of the embodiment, the substrate 252 has the concave portion 261 formed in the supporting surface 2521, the light source 250 is placed in the concave portion 261 of the substrate 252, and the front surface 259a of the light-transmissive member 259 at the first optical member 254 side is level with the front surface 2511 of the first phosphor layer 251.

According to the configuration, the light source 250 is placed in the concave portion 261, and thereby, the light source 250 and the first optical member 254 may be placed apart at a predetermined distance. Thereby, the excitation light EL output from the light source 250 by Lambertian emission may be efficiently entered into the entire area of the first optical member 254.

Further, no level difference is produced between the front surface 259a of the light-transmissive member 259 and the front surface 2511 of the first phosphor layer 251, and thereby, the incident surface of the light entering from the first optical member 254 side may be a planar surface. Thereby, diffused reflection of the light entering from the first optical member 254 side may be suppressed and the illumination light WL may be efficiently extracted from the light emitting portion 260.

The light source device 25 of the embodiment further includes the second optical member 255 having the third optical layer 2552 reflecting the excitation light EL and the fluorescence YL, YL1 and placed with the third optical layer 2552 crossing the supporting surface 2521 and the first optical layer 2542, and the third optical member 256 having the fourth optical layer 2562 reflecting the excitation light EL and the fluorescence YL, YL1 and placed with the fourth optical layer 2562 crossing the supporting surface 2521 and the first optical layer 2542 and facing the third optical layer 2552. The light emitting portion 260 is formed by the substrate 252, the first optical member 254, the second optical member 255, and the third optical member 256.

According to the configuration, a leakage of light from other parts than the light emitting portion 260 is suppressed, and thereby, the illumination light WL may be efficiently output from the light emitting portion 260.

According to the projector 1 of the above described embodiment, the following effects are exerted.

The projector 1 of the embodiment includes the light source device 25, the light modulation devices 4B, 4G, 4R forming the image lights by modulating the blue light LB, the green light LG, and the red light LR from the light source device 25 according to the image information, and the projection optical device 6 projecting the above described image lights.

According to the projector 1 of the embodiment, the light source device 25 generating the bright illumination light WL is provided, and thereby, a high-brightness image may be formed and projected.

Second Embodiment

Subsequently, a configuration of a light source device according to a second embodiment of the present disclosure is explained.

In the embodiment, the configurations or members in common with the first embodiment have the same signs and the explanation of the details is omitted.

Figure 6:
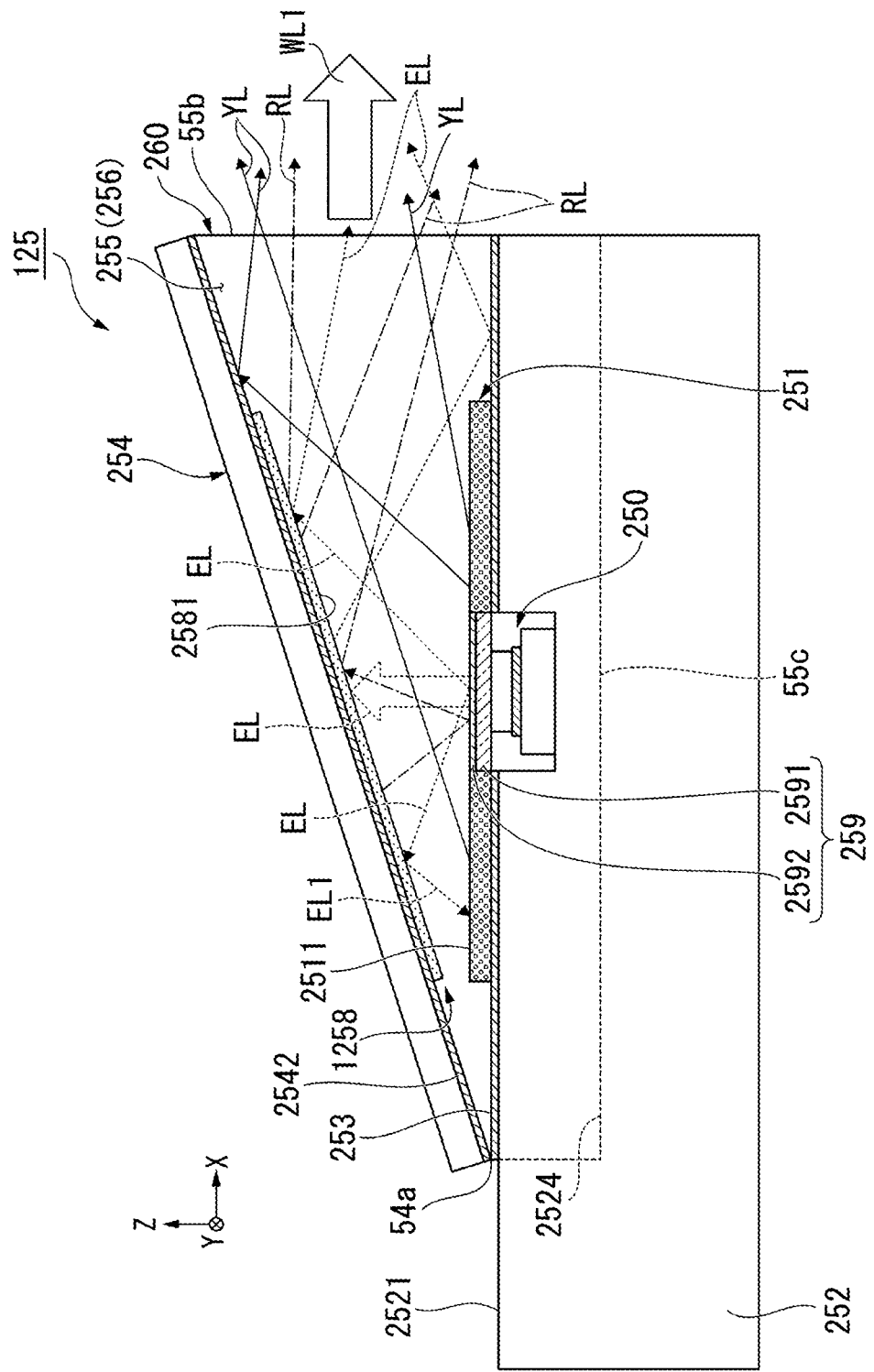
FIG. 6 shows a configuration of a light source device of a second embodiment.

FIG. 6 shows the configuration of the light source device of the embodiment.

As shown in FIG. 6, a light source device 125 of the embodiment includes the light source 250, the first phosphor layer 251, the substrate 252, the mirror layer 253, the first optical member 254, the second optical member 255, the third optical member 256, a second phosphor layer (second wavelength conversion layer) 1258, the light-transmissive member 259, and the light emitting portion 260.

In the embodiment, the second phosphor layer 1258 is formed using a different phosphor material from that of the first phosphor layer 251. The second phosphor layer 1258 converts the excitation light EL into e.g., fluorescence (third light) RL as a red light having a red wavelength range from 600 to 800 nm different from the blue wavelength range. In the embodiment, the red wavelength range (third wavelength range) of the fluorescence RL emitted by the second phosphor layer 1258 is larger than the yellow wavelength range (second wavelength range) of the fluorescence YL emitted by the first phosphor layer 251 and the blue wavelength range (first wavelength range) of the excitation light EL output by the light source 250.

As the red phosphor, e.g., a YAG phosphor (one of Pr:YAG, Eu:YAG, Cr:YAG) of $(Y_{1-x},Gd_x)_3(Al,Ga)_5O_{12}$ in which one of Pr, Eu, Cr is dispersed as an activator agent is used. Note that the activator agent may contain one kind selected from Pr, Eu, Cr or a coactivating activator agent containing some kinds selected from Pr, Eu, Cr.

In the embodiment, the degree of scattering of light in the second phosphor layer 1258 is lower than the degree of scattering of light in the first phosphor layer 251. In the case of the embodiment, the number of scatterers contained in the second phosphor layer 1258 is smaller than the number of scatterers contained in the first phosphor layer 251.

Further, also, in the embodiment, the thickness of the second phosphor layer 1258 is set to be smaller than the thickness of the first phosphor layer 251, and thereby, the fluorescence conversion efficiency in the second phosphor layer 1258 is suppressed and the excitation light EL is easily transmitted.

According to the light source device 125 of the above described embodiment, the fluorescence RL generated by excitation of the second phosphor layer 1258 using the excitation light EL output from the light source 250, the fluorescence YL generated by excitation of the first phosphor layer 251 using the excitation light EL not used for the excitation of the fluorescence RL, but output from the second phosphor layer 1258, and a part of the excitation light EL output from the light source 250, but not used for the excitation of the fluorescence RL, YL may be extracted as an illumination light WL1 from the light emitting portion 260. Therefore, according to the light source device 125 of the embodiment, the bright illumination light WL1 may be output from the light emitting portion 260.

Here, for example, when a white illumination light at 6500 K is generated, if only the yellow fluorescence is used, the red component is insufficient. On the other hand, in the light source device 125 of the embodiment, the red component of the illumination light WL1 may be supplemented by the fluorescence RL as a red light generated in the second phosphor layer 1258. Therefore, according to the light source device 125 of the embodiment, the white illumination light WL1 sufficiently containing the red component with high color reproductivity may be generated.

Thus, according to a projector including the light source device 125 of the embodiment, an image with high brightness and high red reproductivity may be projected.

Third Embodiment

Subsequently, a configuration of a light source device according to a third embodiment of the present disclosure is explained. In the embodiment, the configurations or members in common with the second embodiment have the same signs and the explanation of the details is omitted.

Figure 7:
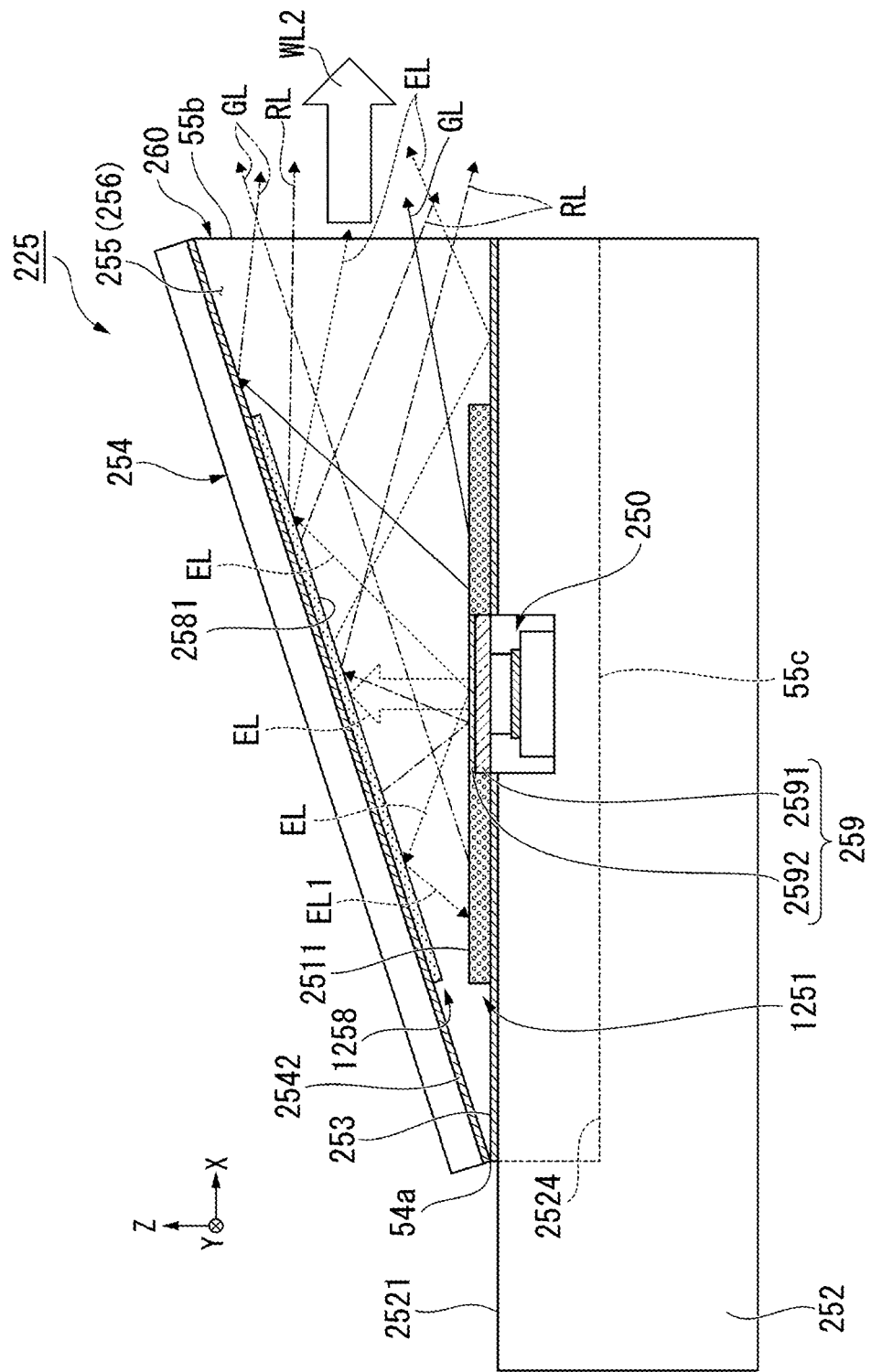
FIG. 7 shows a configuration of a light source device of a third embodiment.

FIG. 7 shows the configuration of the light source device of the embodiment.

As shown in FIG. 7, a light source device 225 of the embodiment includes the light source 250, a first phosphor layer (first wavelength conversion layer) 1251, the substrate 252, the mirror layer 253, the first optical member 254, the second optical member 255, the third optical member 256, the second phosphor layer 1258, the light-transmissive member 259, and the light emitting portion 260.

In the embodiment, the first phosphor layer 1251 is formed using a different phosphor material from that of the first phosphor layer 251 of the first embodiment. The first phosphor layer 1251 converts the excitation light EL into e.g., fluorescence (second light) GL as a green light having a green wavelength range from 500 to 570 nm different from the blue wavelength range. The second phosphor layer 1258 converts the excitation light EL into e.g., the fluorescence (third light) RL as a red light having a red wavelength range from 600 to 800 nm different from the blue wavelength range. In the embodiment, the red wavelength range (third wavelength range) of the fluorescence RL emitted by the second phosphor layer 1258 is larger than the green wavelength range (second wavelength range) of the fluorescence GL emitted by the first phosphor layer 1251 and the blue wavelength range (first wavelength range) of the excitation light EL output by the light source 250.

As the green phosphor, a phosphor material e.g., a $Lu_3Al_5O_{12}:Ce^{3+}$ phosphor, $Y_3O_4:Eu^{2+}$ phosphor, $(Ba,Sr)_2SiO_4:Eu^{2+}$ phosphor, $Ba_3Si_6O_{12}N_2:Eu^{2+}$ phosphor, or $(Si,Al)_6(O,N)_8:Eu^{2+}$ phosphor is used.

In the embodiment, the degree of scattering of light in the second phosphor layer 1258 is lower than the degree of scattering of light in the first phosphor layer 1251. In the case of the embodiment, the number of scatterers contained in the second phosphor layer 1258 is smaller than the number of scatterers contained in the first phosphor layer 1251.

Further, also, in the embodiment, the thickness of the second phosphor layer 1258 is set to be smaller than the thickness of the first phosphor layer 1251, and thereby, the fluorescence conversion efficiency in the second phosphor layer 1258 is suppressed and the excitation light EL is easily transmitted.

According to the light source device 225 of the above described embodiment, the fluorescence RL generated by excitation of the second phosphor layer 1258 using the excitation light EL output from the light source 250, the fluorescence GL generated by excitation of the first phosphor layer 1251 using the excitation light EL not used for the excitation of the fluorescence RL, but output from the second phosphor layer 1258, and a part of the excitation light EL output from the light source 250, but not used for the excitation of the fluorescence RL, GL may be extracted as an illumination light WL2 from the light emitting portion 260.

In the light source device 225 of the embodiment, the fluorescence GL as a green light generated in the first phosphor layer 1251, the fluorescence RL as a red light generated in the second phosphor layer 1258, a part of the excitation light EL as a blue light are used, and thereby, the illumination light WL2 with high color reproductivity in the respective colors of RGB may be generated.

Thus, according to a projector including the light source device 225 of the embodiment, an image with high brightness and high reproductivity of the respective colors RGB may be projected.

Note that the embodiments of the present disclosure are exemplified for explanation, however, the present disclosure is not limited to the above descried embodiments. Various changes can be made without departing from the scope of the present disclosure.

For example, in the first embodiment, the case where the light source 250 is placed in the cutout 251K formed in the first phosphor layer 251 is taken as an example, however, the layout of the light source and the first phosphor layer is not limited to that.

First Modified Example

Figure 8:
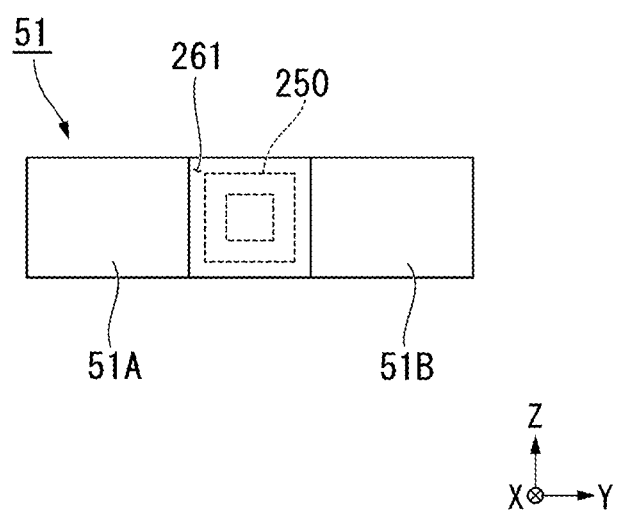
FIG. 8 is a plan view of a first phosphor layer according to a first modified example.

FIG. 8 is a plan view of a first phosphor layer according to a first modified example.

As shown in FIG. 8, a first phosphor layer 51 of the modified example includes a first region 51A and a second region 51B placed apart from each other. The first region 51A and the second region 51B are respectively formed using the same phosphor material as that of the first phosphor layer 251 of the first embodiment. In the modified example, the light source 250 is placed between the first region 51A and the second region 51B. The light source 250 is placed in the concave portion 261 formed in the supporting surface 2521.

According to the configuration, it is not necessary to place the light source 250 within the cutout 251K like the first embodiment, but it is only necessary to place the first region 51A and the second region 51B with the light source 250 in between, and thereby, alignment of the first phosphor layer 51 with the light source 250 is easier.

Note that, in the configurations of the second embodiment and the third embodiment, the first phosphor layer may include two regions and the light source 250 may be placed between the two regions.

In the above described embodiment, the light source 250 is placed in the concave portion 261 formed in the substrate 252, however, the light source 250 may be placed on the supporting surface 2521 of the substrate 252.

Second Modified Example

Figure 9:
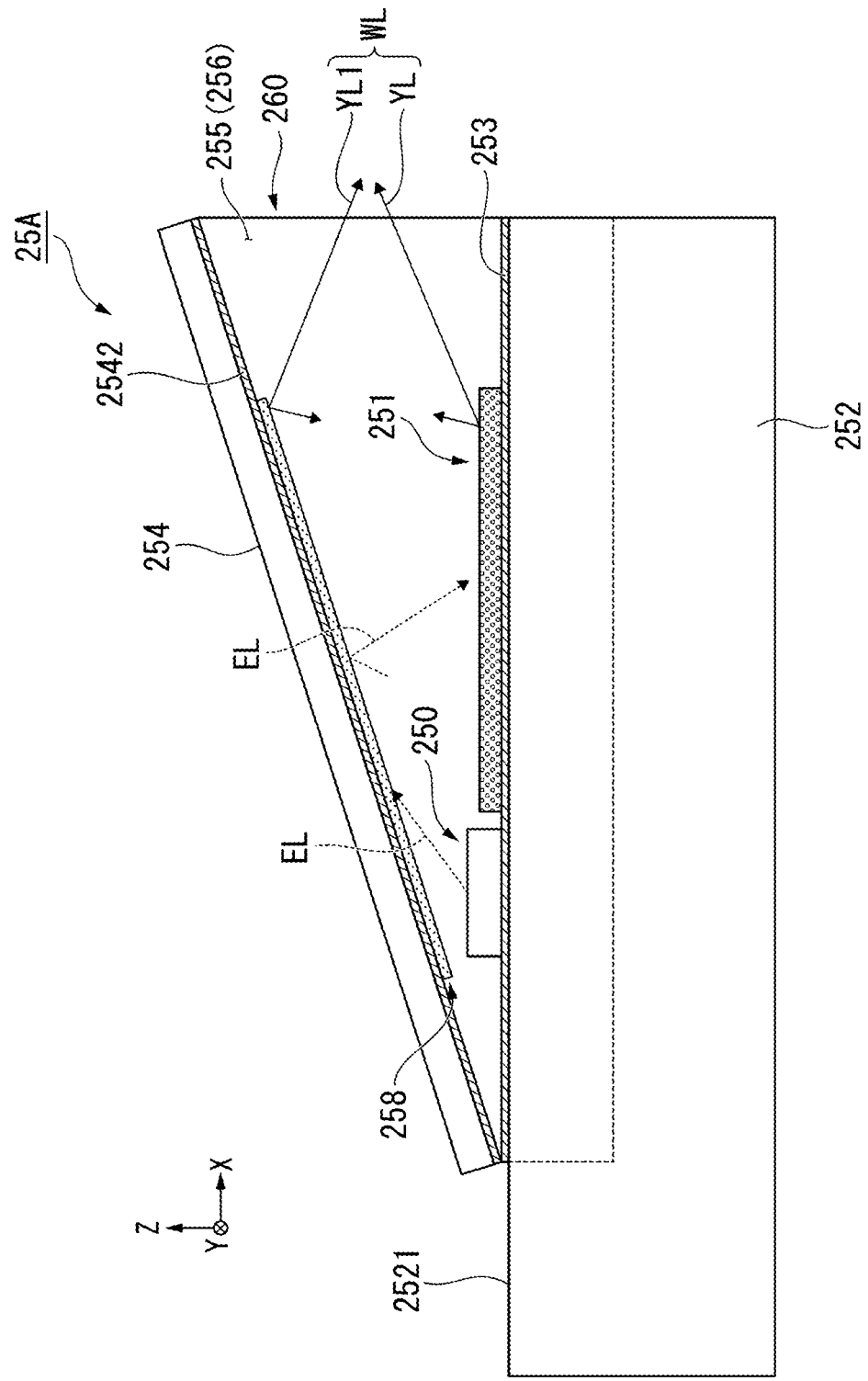
FIG. 9 is a sectional view showing a schematic configuration of a light source device according to a second modified example.

FIG. 9 is a sectional view showing a schematic configuration of a light source device according to a second modified example.

As shown in FIG. 9, a light source device 25A of the modified example includes the light source 250, the first phosphor layer 251, the substrate 252, the mirror layer 253, the first optical member 254, the second optical member 255, the third optical member 256, the second phosphor layer 258, and the light emitting portion 260.

In the light source device 25A of the modified example, the light source 250 and the first phosphor layer 251 are placed in line in the X-axis directions on the supporting surface 2521. Specifically, the light source 250 is placed at the opposite side to the light emitting portion 260 with respect to the first phosphor layer 251.

According to the configuration, the light source 250 is placed at the opposite side to the light emitting portion 260, and thereby, the excitation light EL output from the light source 250 is not directly output from the light emitting portion 260 without entering the second phosphor layer 258 placed on the first optical member 254. Therefore, like the first embodiment, the bright illumination light WL may be output from the light emitting portion 260.

In the above described embodiments, the case where the fluorescence conversion amount in the second phosphor layers 258, 1258 is suppressed by reduction of the quantities of scatterers and the thicknesses of the second phosphor layers 258, 1258 relative to the first phosphor layers 251, 1251 and the excitation light EL is easily transmitted is taken as an example, however, the fluorescence conversion amount may be controlled by adjustment of only the quantities of scatterers or the thicknesses of the second phosphor layers 258, 1258.

In the above described embodiments, the case where the light emitting portion 260 is formed by the substrate 252, the first optical member 254, the second optical member 255, and the third optical member 256 is taken as an example, however, the light emitting portion may be formed at least by the substrate 252 and the first optical member 254.

Further, in the above descried embodiments, the case where the first optical member 254, the second optical member 255, and the third optical member 256 are formed by the respective separate members is taken as an example, however, the first optical member 254, the second optical member 255, and the third optical member 256 may be integrally formed by a single member.

In the above described embodiments, the case where the width of the first phosphor layer 251 in the Y directions is smaller than the width of the supporting surface 2521 located within the housing space housing the first phosphor layer 251 in the Y directions is taken as an example, however, the width of the back surface 2513 of the first phosphor layer 251 in the Y directions and the width of the supporting surface 2521 in the Y directions may be the same. In this case, the side surface 2512 of the first phosphor layer 251 is in contact with the second optical member 255 and the third optical member 256, and thereby, the fluorescence YL output from the side surface 2512 is reflected by the second optical member 255 and the third optical member 256 and returned into the first phosphor layer 251.

Similarly, the case where the width of the second phosphor layer 258 in the Y directions is smaller than the width of the first optical member 254 in the Y directions is taken as an example, however, the width of the second phosphor layer 258 in the Y directions and the width of the first optical member 254 in the Y directions may be the same.

In the above described embodiments, the projector 1 including the three light modulation devices 4R, 4G, 4B is taken as an example, however, the present disclosure can be applied to a projector displaying a color picture by a single light modulation device. Further, the light modulation device is not limited to the above described liquid crystal panel, but, e.g., a digital mirror device may be used.

Further, in the above described embodiments, the example in which the light source device according to the present disclosure is applied to the projector is shown, however, the present disclosure is not limited to that. The light source device according to the present disclosure may be applied to a lighting device such as a headlight for automobile.

A light source device according to an aspect of the present disclosure may have the following configurations.

A light source device according to an aspect of the present disclosure includes a substrate having a supporting surface, a light source placed at a side of the supporting surface and outputting a first light in a first wavelength range, a first optical member having a first optical layer facing the supporting surface and reflecting the first light output from the light source, a first wavelength conversion layer placed on the supporting surface, having a light incident surface entered by the first light, and converting the first light into a second light in a second wavelength range different from the first wavelength range, a second wavelength conversion layer placed at a side of the first wavelength conversion layer with respect to the first optical layer and converting the first light into a third light in a third wavelength range different from the first wavelength range, and a light emitting portion formed by at least the substrate and the first optical member and outputting a light, wherein the first optical layer is inclined relative to the light incident surface and further reflects the second light and the third light, the second wavelength conversion layer converts a part of the first light output from the light source into the third light, the first wavelength conversion layer converts a part of the first light output from the second wavelength conversion layer into the second light, and the light emitting portion outputs the first light, the second light, and the third light.

In the light source device according to the aspect of the present disclosure, the third wavelength range may be the second wavelength range.

In the light source device according to the aspect of the present disclosure, the first light may be a blue light and the second light and the third light may be yellow lights, and the light emitting portion may output a white illumination light containing the first light, the second light, and the third light.

In the light source device according to the aspect of the present disclosure, the third wavelength range may be larger than the first wavelength range and the second wavelength range.

In the light source device according to the aspect of the present disclosure, the first light may be a blue light, the second light may be a yellow light, and the third light may be a red light, and the light emitting portion may output a white illumination light containing the first light, the second light, and the third light.

In the light source device according to the aspect of the present disclosure, the first light may be a blue light, the second light may be a green light, and the third light may be a red light, and the light emitting portion may output a white illumination light containing the first light, the second light, and the third light.

In the light source device according to the aspect of the present disclosure, a thickness of the second wavelength conversion layer may be smaller than a thickness of the first wavelength conversion layer.

In the light source device according to the aspect of the present disclosure, a degree of scattering of light in the second wavelength conversion layer may be smaller than a degree of scattering of light in the first wavelength conversion layer.

In the light source device according to the aspect of the present disclosure, the light source may be placed at an opposite side to the light emitting portion with respect to the first wavelength conversion layer.

In the light source device according to the aspect of the present disclosure, the first wavelength conversion layer may have a cutout formed by partially cutting out, and the light source may be placed in the cutout of the first wavelength conversion layer.

In the light source device according to the aspect of the present disclosure, the first wavelength conversion layer may include a first region and a second region placed apart from each other, and the light source may be placed between the first region and the second region.

In the light source device according to the aspect of the present disclosure, the light source may have a light emitting device emitting the first light, a base member supporting the light emitting device, and a reflection layer provided between the base member and the light emitting device.

The light source device according to the aspect of the present disclosure further includes a light-transmissive member provided in contact with a light exiting side of the light source.

In the light source device according to the aspect of the present disclosure, the light-transmissive member may have a second optical layer provided at an opposite side to the light source, transmitting the first light, and reflecting the second light and the third light.

In the light source device according to the aspect of the present disclosure, the substrate may have a concave portion formed in the supporting surface, the light source may be placed in the concave portion of the substrate, and a surface at the first optical member side of the light-transmissive member may be level with the light incident surface of the first wavelength conversion layer.

The light source device according to the aspect of the present disclosure further includes a second optical member having a third optical layer reflecting the first light, the second light, and the third light and placed with the third optical layer crossing the supporting surface and the first optical layer, and a third optical member having a fourth optical layer reflecting the first light, the second light, and the third light and placed with the fourth optical layer crossing the supporting surface and the first optical layer and facing the third optical layer, wherein the light emitting portion may be formed by the substrate, the first optical member, the second optical member, and the third optical member.

A projector according to an aspect of the present disclosure may have the following configurations.

A projector according to an aspect of the present disclosure includes the light source device according to the aspect of the present disclosure, a light modulation device modulating a light from the light source device according to image information, and a projection optical device projecting the light modulated by the light

What is claimed is:

1. A light source device comprising:
    a substrate having a supporting surface;
    a light source disposed at a supporting surface side and configured to emit first light in a first wavelength range;
    a first optical member having a first optical layer facing the supporting surface and reflecting the first light emitted from the light source;
    a first wavelength conversion layer disposed on the supporting surface and having a light incident surface which the first light enters, the first wavelength conversion layer being configured to convert the first light into second light in a second wavelength range different from the first wavelength range;
    a second wavelength conversion layer disposed at a first wavelength conversion layer side with respect to the first optical layer and configured to convert the first light into third light in a third wavelength range different from the first wavelength range; and
    a light emitting portion formed by at least the substrate and the first optical member, wherein
    the first optical layer is inclined with respect to the light incident surface and further reflects the second light and the third light,
    the second wavelength conversion layer converts a part of the first light emitted from the light source into the third light,
    the first wavelength conversion layer converts a part of the first light emitted from the second wavelength conversion layer into the second light, and
    the light emitting portion emits the first light, the second light, and the third light.

2. The light source device according to claim 1, wherein the third wavelength range is the second wavelength range.

3. The light source device according to claim 2, wherein the first light is blue light and each of the second light and the third light is yellow light, and
    the light emitting portion emits white illumination light containing the first light, the second light, and the third light.

4. The light source device according to claim 1, wherein the third wavelength range is larger than each of the first wavelength range and the second wavelength range.

5. The light source device according to claim 4, wherein the first light is blue light, the second light is yellow light, and the third light is red light, and
    the light emitting portion emits white illumination light containing the first light, the second light, and the third light.

6. The light source device according to claim 4, wherein the first light is blue light, the second light is green light, and the third light is red light, and
    the light emitting portion emits white illumination light containing the first light, the second light, and the third light.

7. The light source device according to claim 1, wherein a thickness of the second wavelength conversion layer is smaller than a thickness of the first wavelength conversion layer.

8. The light source device according to claim 1, wherein a degree of scattering of light in the second wavelength conversion layer is smaller than a degree of scattering of light in the first wavelength conversion layer.

9. The light source device according to claim 1, wherein the light source is disposed at an opposite side to the light emitting portion with respect to the first wavelength conversion layer.

10. The light source device according to claim 1, wherein the first wavelength conversion layer has a cutout formed by partially cutting out, and
    the light source is disposed in the cutout of the first wavelength conversion layer.

11. The light source device according to claim 1, wherein the first wavelength conversion layer includes a first region and a second region which separate from each other, and
    the light source is disposed between the first region and the second region.

12. The light source device according to claim 1, wherein the light source has a light emitting device configured to emit the first light, a base supporting the light emitting device, and a reflection layer disposed between the base and the light emitting device.

13. The light source device according to claim 1, further comprising
    a light-transmissive member provided in contact with a light exiting side of the light source.

14. The light source device according to claim 13, wherein the light-transmissive member has a second optical layer disposed at an opposite side to the light source, and configured to transmit the first light and reflect the second light and the third light.

15. The light source device according to claim 13, wherein
    the substrate has a concave portion formed in the supporting surface, the light source is disposed in the concave portion of the substrate, and a surface at a first optical member side of the light-transmissive member is flush with the light incident surface of the first wavelength conversion layer.

16. The light source device according to claim 1, further comprising:

a second optical member having a third optical layer reflecting the first light, the second light, and the third light, the third optical layer intersecting the supporting surface and the first optical layer; and a third optical member having a fourth optical layer reflecting the first light, the second light, and the third light, the fourth optical layer intersecting the supporting surface and the first optical layer and facing the third optical layer, wherein the light emitting portion is formed by the substrate, the first optical member, the second optical member, and the third optical member.

17. A projector comprising:

the light source device according to claim 1;

a light modulation device modulating light emitted from the light source device; and a projection optical device projecting the light modulated by the light modulation device.

* * * * *